3,062,891
PRODUCTION OF DIMETHYL SULFIDE
Fritz Hübenett, Wesseling, Germany, and Nicolaus Schnack, Brussels, Belgium, assignors to Union Rheinische Braunkohlen Kraftstoff AG, Wesseling, Bezirk, Koln, Germany, a corporation of Germany
No Drawing. Filed Feb. 5, 1959, Ser. No. 791,268
3 Claims. (Cl. 260—609)

The present invention relates to an improvement and economical process of producing dimethyl sulfide by reacting dimethyl ether and hydrogen sulfide. This application is a continuation-in-part of our copending application Serial No. 640,306 filed February 15, 1957, and now abandoned.

Dialkyl sulfides have until now been produced by various methods, for instance by reacting mercaptans with alkylation agents, from alcohol and hydrogen sulfide in the presence of acidic catalysts or from the waste products obtained in the sulfite cellulose process. However, all these processes suffer from the disadvantage that they cannot be carried out in an economic manner.

In accordance with the present invention, it has now been found that dimethyl sulfide can be produced in a simple and highly economic manner by reacting dimethyl ether with hydrogen sulfide. The dimethyl sulfide is obtained by the process of the invention in very high yields approaching the theoretical. The ease with which the process of the invention can be carried out could not be foreseen, since the reaction of aliphatic ethers mostly involves difficulties as compared with the reaction of the corresponding alcohols. The process of the invention shows a considerable advantage over the conventional method of producing dialkyl sulfides by reacting alcohols and hydrogen sulfide, because the mercaptans formed as by-products in the aforesaid known process are obtained in the process of the invention only in negligible quantities.

Dimethyl sulfide is obtained according to the invention by passing dimethyl ether vapors and hydrogen sulfide over catalysts at temperatures of 150–450° C., preferably 250–350° C. Catalysts which are especially suitable for the process of the invention contain at least 5% by weight of sulfur-containing compounds of metals of group VI of the periodic system, preferably tungsten and molybdenum. The sulfides of these metals can be used either in pure form or they may be applied on carriers, for instance aluminum and silicon oxides. Instead of said metal sulfides, other compounds of said metals may be used as catalysts, for instance the oxides, which under the reaction conditions are converted to sulfides, at least on their surfaces, and will thus catalyze the reaction as if the metal sulfides are employed as contact material from the beginning.

It may be of advantage to carry out the reaction of the invention under superatmospheric pressure. Besides, the use of an excess of ether over the molecular amount has proved to be advantageous. The economy of the process of the invention can be still further improved by recycling a part or all of the waste gases formed in the reaction.

The advance brought about by the process of the inventoin is so material that it is preferable to produce first dimethyl ether in known manner from methanol and to convert the dimethyl ether thus obtained by the herein described process to dimethyl sulfide.

The invention is further illustrated by the following example without being restricted thereto.

EXAMPLE I 3 liters each of hydrogen sulfide and dimethyl ether are passed through an electrically heated glass tube of a diameter of 27 mm., said glass tube containing 50 cc. of tungsten sulfide in the form of about $\frac{1}{10}$ inch pellets. The contact layer is kept at a temperature of 275° C. The major part of the resulting dimethyl sulfide and the water formed in the reaction are separated from the reaction products by condensation in a water cooler. The residual dimethyl sulfide is then precipitated in a second cooler which is kept at —5 to —10° C. by means of cooling brine. After separating the aqueous layer and the organic layer, which is lighter in weight, and drying the product with $CaCl_2$, dimethyl sulfide is obtained in a yield of about 87% based on the dimethyl ether charged.

EXAMPLE II

In a similar reaction as described in Example I, a catalyst containing 27% by weight of tungsten sulfide on alumina was tested while the reaction temperature was held at 260° C. The yield of dimethyl sulfide was 71.7%.

EXAMPLE III

A catalyst containing 6% by weight of tungsten oxide, 40% of silica and 44% of alumina was tested as described in Example I. A comparsion of 5 runs in the following Table 1 shows the importance of the reaction temperature.

Table 1

| No. | Temperature, °C. | Percent Yield based on dimethyl ether |
|---|---|---|
| 1 | 150 | 5 |
| 2 | 200 | 14 |
| 3 | 300 | 72 |
| 4 | 400 | 81 |
| 5 | 450 | 74 |

After the first run, the catalyst employed in the above example contained 4.8% by weight of tungsten and 1.7% of sulfur. This corresponds to 6.5% of tungsten sulfide of about the formula $WS_2$. This shows that all the tungsten oxide was converted to the sulfide.

EXAMPLE IV

A catalyst containing 8.6% by weight of molybdenum oxide on alumina was tested in the same way as described in Example I in a number of different runs but at a temperature of about 350° C. The yields will be seen from Table 2.

Table 2

| No. | Temperature | Feed | | Recycled Gases, l./h. | Yields based on $H_2S$, percent |
|---|---|---|---|---|---|
| | | $H_2S$, l./h. | ether, l./h. | | |
| 1 | 350 | 3 | 3 | 0 | 89.9 |
| 2 | 350 | 3 | 3.1 | 0 | 90.8 |
| 3 | 350 | 3 | 3.2 | 0 | 91.4 |
| 4 | 350 | 3 | 3.2 | 0.3 | 93.0 |
| 5 | 350 | 3 | 3.1 | see below | 97.2 |

In run 5 the gases escaping from the reaction zone were condensed by cooling, the water formed in the reaction was separated from the resulting organic layer and the organic products were distilled. The gases from the distillation zone were cooled to about —25° C., the thereby liquefied products were recycled to the reaction zone after separating and vaporizing. The recycled gases consisted of 14% of dimethyl sulfide, 17% of dimethyl ether, 68% of methyl mercaptan and 1% of other gases. After the experiment the catalyst contained 11.48% of molybdenum sulfide very closely corresponding to the formula $MoS_3$.

Obviously many modifications and variations of the present invention are possible in the light of the above teachings. It is, therefore, to be understood that within the scope of the appended claims the invention may be practiced otherwise than as specifically described.

We claim:

1. Process of producing dimethyl sulfide by reacting dimethyl ether vapors and hydrogen sulfide at temperatures of 150–450° in the presence of a catalyst consisting of from 6 to 50% by weight of a sulfide of a metal selected from the group consisting of tungsten and molybdenum, the remainder of the catalyst consisting of oxides selected from the group consisting of aluminum and silicon oxides.

2. Process as claimed in claim 1, wherein at least a part of the gases escaping from the reaction zone is recycled.

3. Process as claimed in claim 1, wherein the dimethyl ether is used in an excess over the stoichiometric quantity.

References Cited in the file of this patent

UNITED STATES PATENTS

| | | |
|---|---|---|
| 1,993,287 | Seaman | Mar. 5, 1935 |
| 2,035,121 | Frolich | Mar. 24, 1936 |
| 2,038,599 | Pier et al. | Apr. 28, 1936 |
| 2,816,146 | Doumani | Dec. 10, 1957 |
| 2,820,063 | Folkins | Jan. 14, 1958 |